United States Patent
Glazko et al.

(10) Patent No.: US 6,813,478 B2
(45) Date of Patent: Nov. 2, 2004

(54) METHOD AND APPARATUS FOR SEARCHING A GATED PILOT

(75) Inventors: Serguei A. Glazko, San Diego, CA (US); Peter J. Black, San Diego, CA (US); Raghu Challa, San Diego, CA (US)

(73) Assignee: Qualcomm Inc, San Diego, CA (US)

( * ) Notice: Subject to any disclaimer, the term of this patent is extended or adjusted under 35 U.S.C. 154(b) by 0 days.

(21) Appl. No.: 09/846,963

(22) Filed: May 1, 2001

(65) Prior Publication Data

US 2002/0160719 A1 Oct. 31, 2002

Related U.S. Application Data

(60) Provisional application No. 60/268,187, filed on Feb. 12, 2001.

(51) Int. Cl.[7] .................. H04B 17/00; H04B 7/216; H04J 1/16
(52) U.S. Cl. ............... 455/67.14; 370/491; 370/342
(58) Field of Search .................. 455/67.14, 434, 455/515, 67.4; 370/491, 500, 335, 342

(56) References Cited

U.S. PATENT DOCUMENTS 5,805,648 A * 9/1998 Sutton .................. 375/367

2003/0007468 A1 * 1/2003 Joshi et al. .................. 370/335
2003/0031144 A1 * 2/2003 Joshi et al. .................. 370/335

OTHER PUBLICATIONS

XP-002198525.*

* cited by examiner

*Primary Examiner*—David Hudspeth
*Assistant Examiner*—Sheila Smith
(74) *Attorney, Agent, or Firm*—Philip R Wadsworth; Charles D Brown; Timothy F. Loomis

(57) ABSTRACT

Techniques to search for a gated pilot reference in a wireless communication system. In one method, an overall code space in which the pilot may be found is partitioned into a number of groups of code sets, with each code set representative of all possible chip offsets of a specific PN sequence. The groups are ordered based on the likelihood of detecting the pilot in each of the groups. The groups of code sets are then used to search for the pilot, one group at a time, starting with the group most likely to result in successful pilot acquisition and ending with the group least likely to result in successful pilot acquisition. The search is terminated upon successful acquisition. The pilot search may be performed using detect, dwell, and pull-in substages. The detect substage for one group may be performed in parallel with the pull-in substage for another group.

40 Claims, 9 Drawing Sheets

METHOD AND APPARATUS FOR SEARCHING A GATED PILOT

CROSS-REFERENCE TO RELATED APPLICATIONS

This application claims the benefit of U.S. Provisional Patent Application No. 60/268,187, filed Feb. 12, 2001.

BACKGROUND

1. Field

The present invention relates to data communication, and more particularly to techniques for searching and acquiring a gated pilot reference in a wireless communication system.

2. Background

Wireless communication systems are widely deployed to provide various types of communication such as voice, data, and so on, for a number of users. These systems may be based on code division multiple access (CDMA), time division multiple access (TDMA), frequency division multiple access (FDMA), or some other multiple access techniques. CDMA systems may provide certain advantages over other types of system such as increased system capacity In a wireless communication system, a pilot reference is often transmitted from a transmission source to a receiver device to assist the receiver device perform a number of functions. The pilot reference is typically generated based on a known data pattern (e.g., all zeros) and using a known signal processing scheme (e.g., covered with a particular orthogonal code and spread with a known PN sequence). The pilot reference may be used at the receiver device for synchronization with the timing and frequency of the transmission source, estimation of the quality of the communication link, and coherent demodulation of a data transmission. For a CDMA system that conforms to IS-856 standard, the pilot reference is also used to determine the particular access point having the best link to the terminal and the highest data rate supported by this access point.

In IS-95 CDMA systems, a pilot reference is continuously transmitted from each base station on a dedicated pilot channel at a relatively low transmit power level. A terminal receives and processes a forward link signal to isolate the pilot channel, and further processes the pilot channel to recover the pilot reference. The continuous pilot transmission scheme used for IS-95 CDMA systems is more suitable for a low data rate transmission system whereby the terminal is allowed more time to process the pilot reference. However, for a high-speed data transmission system in which the link condition is required to be accurately estimated within a short time period, this continuous low-level pilot reference is not preferred.

Newer generation CDMA systems (such as those that conform to cdma2000, IS-856, and W-CDMA standards) transmit a gated pilot reference at a high (e.g., peak) transmit power level. The short but high-power pilot bursts allow a terminal to receive the pilot reference within a short time interval, which then allows the terminal to estimate the link condition within a shorter time period.

The search for a gated pilot reference is associated with greater ambiguity than that for a continuous pilot reference. To search for a continuous pilot reference, the received signal for a particular time window may be searched, and the pilot reference and its timing is determined by evaluating a number of hypotheses for all possible time offsets of the pilot reference (described in further detail below). If the pilot reference is continuous, it is present in any time window to be searched and only its timing is unknown. However, for a gated pilot reference that is not transmitted at all times, a number of time windows may need to be searched to catch the pilot reference. A search for a pilot reference over a given time window would result in a pilot acquisition failure even if all hypotheses are evaluated if the pilot reference was not transmitted during this time window. Thus, acquisition of a gated pilot reference is more complicated because a number of time windows as well as a number of hypotheses need to be evaluated to find and acquire the gated pilot reference.

There is therefore a need in the art for techniques to more efficiently search and acquire a gated pilot reference.

SUMMARY

Aspects of the invention provide techniques to search and acquire a gated pilot reference in a manner to achieve faster acquisition time and a high probability of detection. For a wireless communication system that transmits a gated pilot reference, a larger code space needs to be searched than that for a continuous pilot reference. Various techniques are provided herein to shorten the average pilot acquisition time in the search over the larger code space.

In one aspect, the overall code space to be searched to acquire the pilot reference is divided into code sets, with each code set including a number of hypotheses to be search. The code sets are then grouped such that the resultant groups include code sets of varying likelihood of yielding a successful pilot acquisition. The groups of code sets are then search, one group at a time, in a defined order such that code sets more likely to result in successful pilot acquisition are searched first, and code sets least likely to result in successful pilot acquisition are searched last. Mechanisms are provided to terminate the acquisition process early upon successful acquisition of the pilot reference in the more likely used code space.

In another aspect, a multi-step pilot acquisition scheme is provided to search for and acquire pilot references, and some of the steps are pipelined to shorten the search time. A multi-stage pilot search scheme is also provided to search for pilot references using multiple (e.g., two) stages, wherein a different set of search parameter values may be used for each stage to improve the likelihood pilot acquisition for different operating conditions. The multi-stage pilot search scheme may advantageously incorporate the search by groups and the pipelining described above.

A specific embodiment of the invention provides a method for searching for a gated pilot reference in a wireless communication system. In accordance with the method, an overall code space in which the pilot reference may be found is initially partitioned into a number of (e.g., four) groups of non-overlapping code sets, with each code set being representative of all possible chip offsets of a specific PN sequence (with a particular PN offset). The groups are then ordered based on the likelihood of detecting the pilot reference in each of the groups, with the first group being the most likely to be used to generate the pilot reference and a last group being the least likely to be used. The groups of code sets are then used to search for the pilot reference, one group at a time, starting with the first group and ending with the last group. Upon acquisition of the pilot reference, the search may be terminated.

The search for the pilot reference may be performed using three substages comprised of a detect, a dwell, and a pull-in substage. In the detect substage for a particular group, the pilot reference is searched for in a set of samples based on the code sets in the group to provide a number of detected peaks. In the dwell substage, the detected peaks from the detect substage are re-evaluated to provide one or more candidate peaks. And in the pull-in substage, a lock is attempted on each candidate peak to achieve acquisition of the pilot reference. The detect substage for one group may be performed in parallel (i.e., pipelined) with the pull-in substage for another group.

The invention further provides other methods, receiver units, and other elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
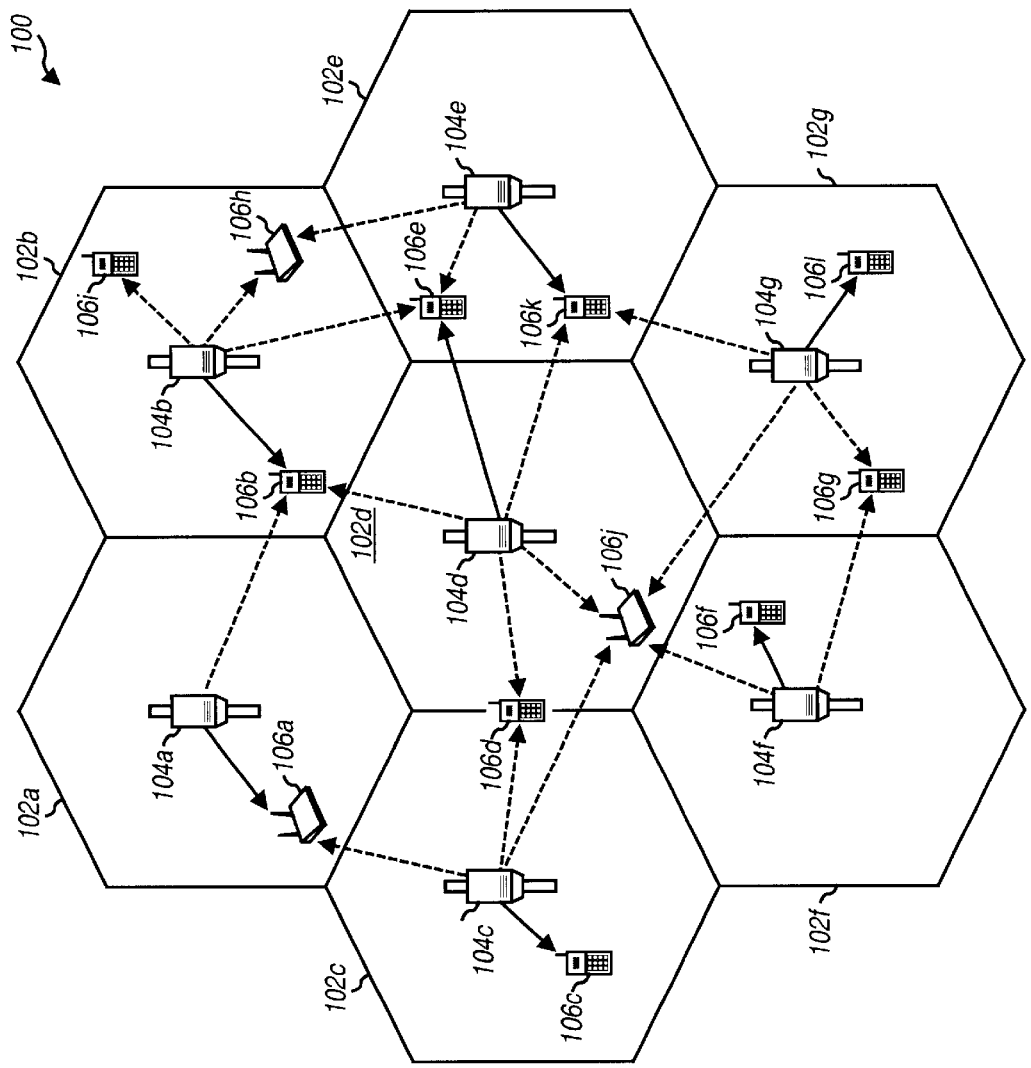
FIG. 1 is a diagram of a wireless communication system that supports a number of users and transmits gated pilot references.

FIG. 1 is a diagram of a wireless communication system 100 that supports a number of users and transmits gated pilot references. System 100 provides communication for a number of cells 102a through 102g, with each cell 102 being serviced by a corresponding access point 104. Various access terminals 106 are dispersed throughout the system. The access point is also referred to as a base station, and the access terminal is also referred to as a remote terminal or mobile station or just simply terminal.

In an embodiment, each terminal 106 may communicate with one access point 104 on the forward link at any given moment, and may communicate with one or more access points on the reverse link depending on whether the terminal is in soft handoff. The forward link (i.e., downlink) refers to transmission from the access point to the terminal, and the reverse link (i.e., uplink) refers to transmission from the terminal to the access point. System 100 may be designed to conform to any number of CDMA standards and/or design, such as the cdma2000, IS-856, and W-CDMA standards. A CDMA system that conforms to the IS-856 standard is referred to herein as a High Data Rate (HDR) system.

In FIG. 1, a solid line with an arrow indicates a user-specific data transmission from an access point to a terminal. A broken line with an arrow indicates that the terminal is receiving the pilot reference and other signaling but no user-specific data transmission from the access point. As shown in FIG. 1, access point 104a transmits data to terminal 106a on the forward link, access point 104b transmits data to terminal 106b, base station 104c transmits data to terminal 106c, and so on. The uplink communication is not shown in FIG. 1 for simplicity.

Figure 2:
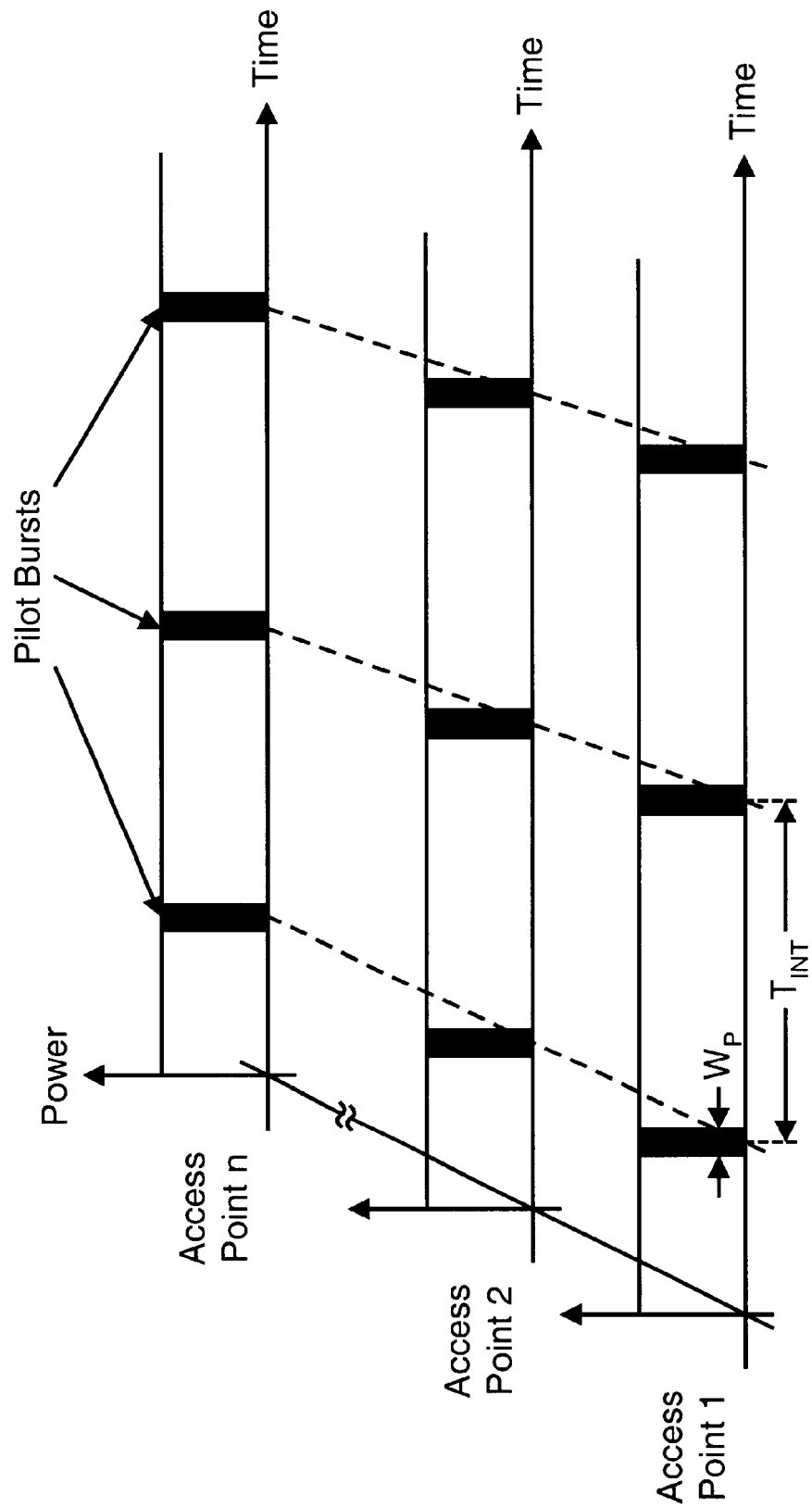
FIG. 2 is a diagram of a pilot reference transmission scheme used for a system that conforms to IS-856 standard.

FIG. 2 is a diagram of a gate pilot reference transmission scheme used for the HDR system. FIG. 2 shows the transmission of pilot references from a number of access points, with the pilot references being transmitted in bursts of a particular width ($W_P$) at a predetermined time interval ($T_{INT}$). As indicated in FIG. 2, the timing of the access points is synchronized such that the pilot bursts are approximately aligned at the time of their transmission. In this transmission scheme, the pilot references from the access points may be received at a terminal at approximately the same time instance, with any timing skew between the pilot references from different access points being due to differences in transmission delays and other factors.

Figure 3:
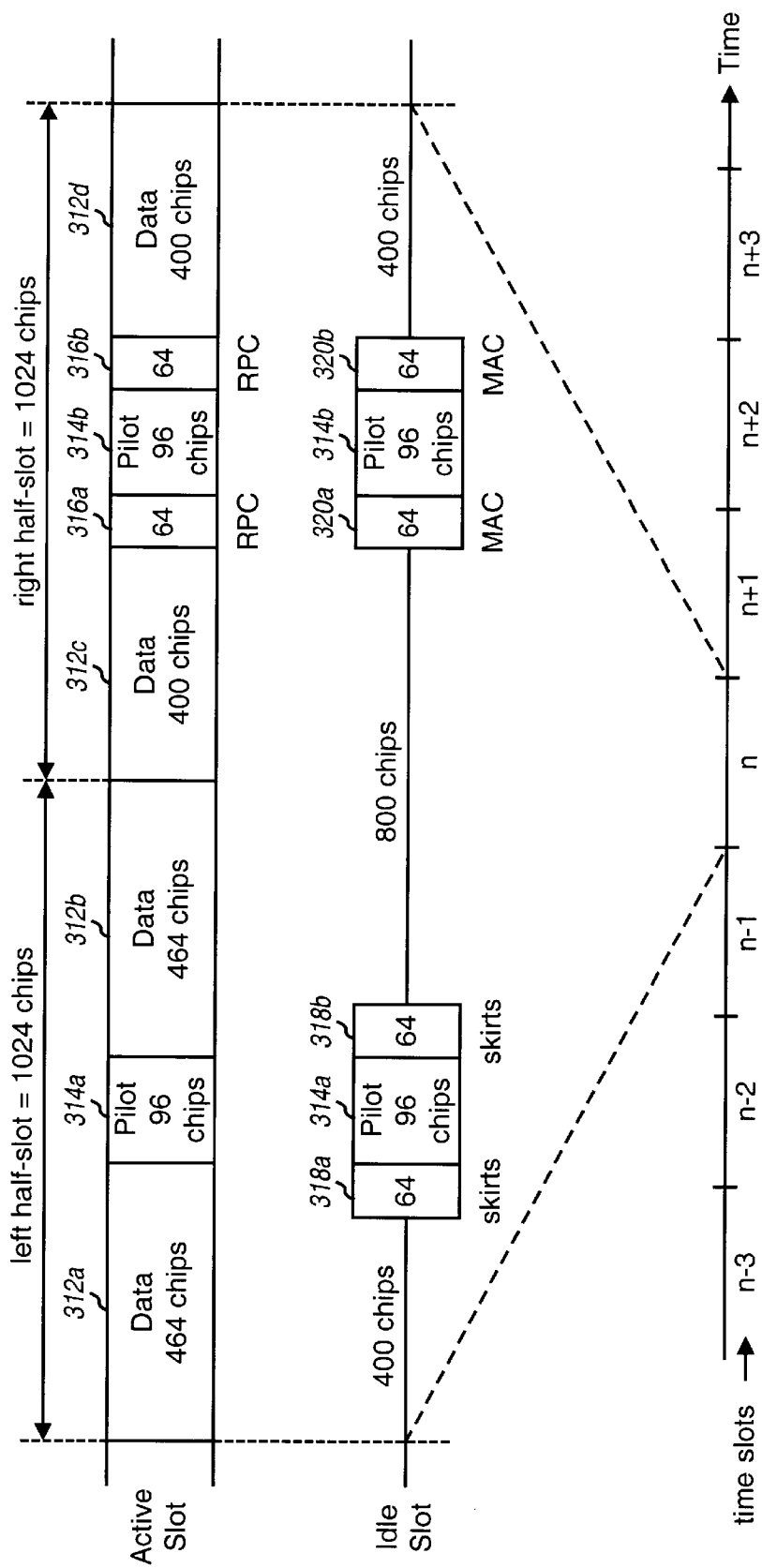
FIG. 3 is a diagram of a transmission format defined by the IS-856 standard.

FIG. 3 is a diagram of a transmission format defined by the IS-856 standard. As shown in FIG. 3, data and signaling are transmitted in slots, with each slot covering a particular time interval (e.g., 1.667 msec for the IS-856 standard). Each "active" slot is divided into two half-slots, with each half-slot including two data partitions 312 separated by a pilot burst 314. Data partitions 312 may be used to transmit user-specific data and signaling, and pilot bursts 314 may be used to transmit a pilot reference. As defined by the IS-856 standard, each pilot burst comprises 96 chips of a particular data pattern (e.g., all zeros data). The second half-slot further includes two signaling bursts 316a and 316b placed on both sides of pilot burst 314b and used to implement a signaling channel.

As also shown in FIG. 3, each "idle" slot is also divided into two half-slots, and each half-slot also includes one pilot burst 314 of the same width (e.g., 96 chips) and located in the same position in the half-slot as for the active slot. The pilot bursts for the idle slot are essentially indistinguishable from the pilot bursts for the active slot. Two skirts 318a and 318b are positioned on both sides of pilot burst 314a in the first half-slot of the idle slot, and two signaling bursts 320a and 320b are placed on both sides of pilot burst 314b in the second half-slot. Skirts 318a and 318b are used to provide a transition period between blank (or no) transmission and pilot transmission. This transition period allows the pilot reference to reach or be near its steady state value for the duration of the (e.g., 96-chip) pilot burst.

Figure 4A:
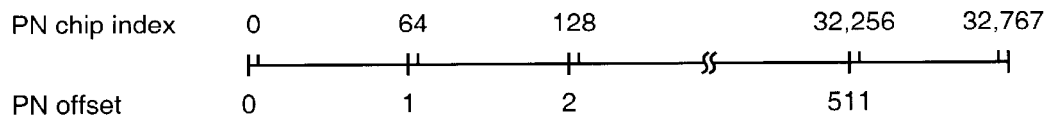
FIG. 4A is a diagram showing the indices for a pseudo-noise (PN) sequence used to generate the pilot references at the access points.

FIG. 4A is a diagram showing the indices for a pseudo-noise (PN) sequence used to generate the pilot references at the access points. In CDMA systems, the pilot references from neighboring access points are differentiated from one another by spreading the pilot data (typically a sequence of all zeros) at the access points with a defined PN sequence at different PN chip offsets. The PN sequence has a specific data pattern and a fixed length of 32,768 chips, but is continually repeated to generate a continuous spreading sequence that is then used to spread the pilot and traffic data. The start of the PN sequence is defined by the CDMA standard and is synchronized to an absolute time reference, $T_{ABS}$. Each chip of the PN sequence is assigned a respective PN chip index, with the start of the PN sequence being assigned a PN chip index of 0 and the last chip of the PN sequence being assigned a PN chip index of 32,767.

The PN sequence may be partitioned into 512 different "PN offsets", numbered from 0 through 511, with consecutively numbered PN offsets being separated by 64 chips. Effectively, 512 different PN sequences may be defined based on the 512 different PN offsets, with each of the 512 PN sequences having a different starting point at the absolute time reference based on its PN offset. Thus, the PN sequence with a PN offset of 0 starts at PN chip index 0 at TABS, the PN sequence with a PN offset of 1 starts at PN chip index 64 at $T_{ABS}$, the PN sequence with a PN offset of 2 starts at PN chip index 128 at $T_{ABS}$, and so on, and the PN sequence with a PN offset of 511 starts at PN chip index 30,704 at $T_{ABS}$.

The 512 possible PN sequences may then be assigned to the access points in a CDMA system and used, among other functions, to differentiate the access points. The closest PN offsets that may be assigned to the (neighboring) access points are determined by the CDMA standards. For example, the IS-95 and IS-856 standards define a minimum value of one for PN_INC, which stands for PN chip index increment in number of 64 chips. Thus, a PN_INC of one denotes that the (neighboring) access points may be assigned to PN sequences separated by a minimum PN offset of one (or 64 PN chips). A lower PN_INC value (e.g., one) results in more available PN offsets (e.g., 512) that may be assigned to the access points. Conversely, a larger PN_INC value (e.g., four) results in fewer available PN offsets (e.g., 128) that may be assigned to the access points.

At the terminal, the pilot reference from a selected access point may be recovered by processing a received signal in a manner complementary to that performed at the access point. The processing at the terminal typically include (1) conditioning and digitizing the received signal to provide data samples, (2) despreading the data samples with a PN sequence at a specific PN offset that matches the PN offset of the selected access point (as received at the terminal), (3) decovering the despread samples with the same orthogonal code used to cover the pilot data at the selected access point, and (4) correlating the decovered samples with the pilot data pattern. To simplify the signal processing, CDMA systems typically use a pilot data pattern of all zeros and an orthogonal code of zero for the pilot reference. Thus, the processing to recover the pilot reference may be achieved by simply correlating the data samples with the PN sequence. This complementary signal processing recovers the (desired) pilot reference from the selected access point and removes other (extraneous) transmissions from this and other access points.

Because of propagation delays and multipaths, the time of arrival of the pilot reference from the selected access point is not known with certainty. Thus, in the search for the pilot reference from the selected access point, an entire "code space" may need to be searched. For a continuously transmitted pilot reference, this may mean correlating the data samples with a locally generated PN sequence at each of the 32,768 possible chip offsets (or phases) and determining which chip offset provides a high correlated result. Due to the pseudo-random noise nature of the PN sequence, the cross-correlation of the data samples with the PN sequence should be zero (ideally) except when the phase of the locally generated PN sequence is aligned with that of the data samples (if no noise is present).

Figure 4B:
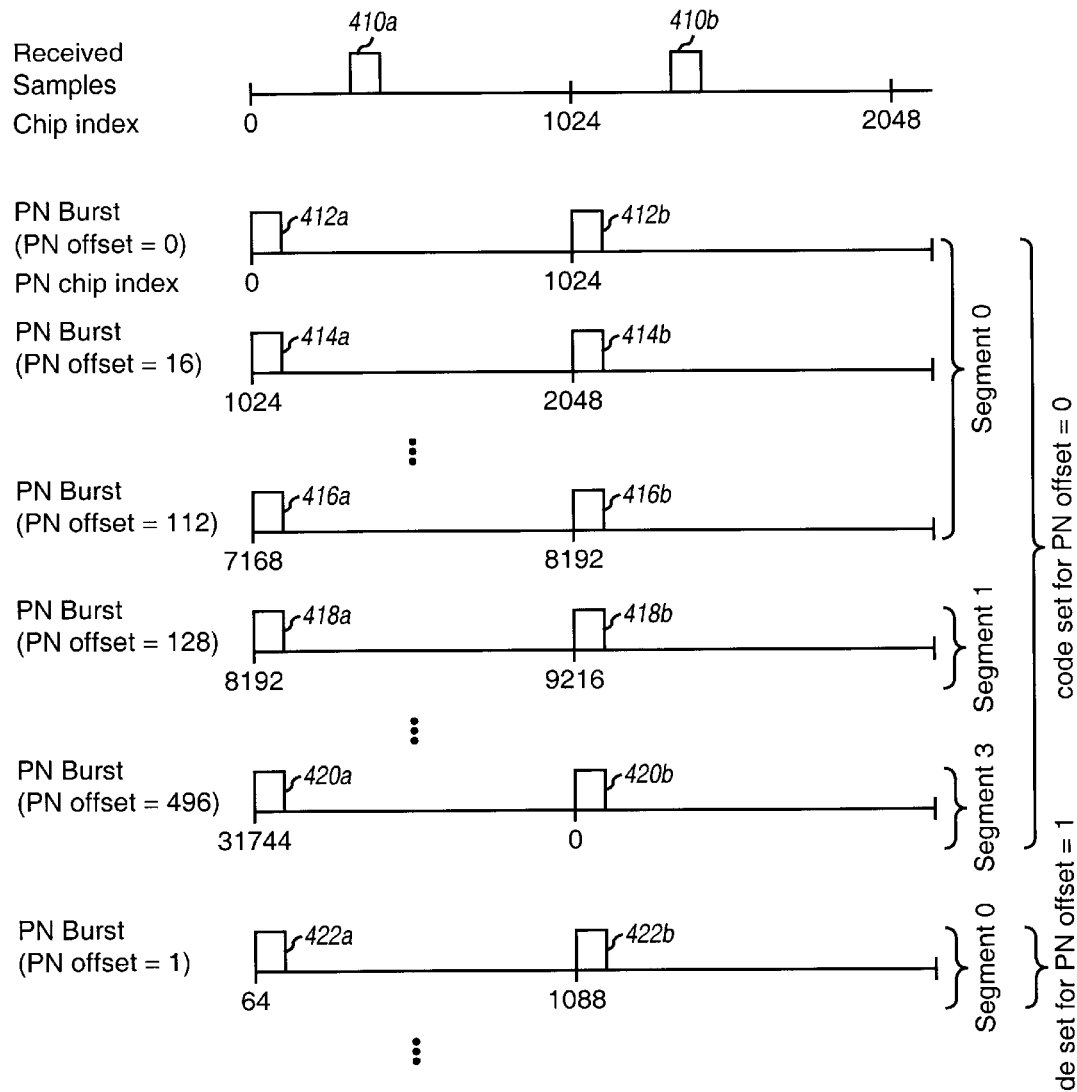
FIG. 4B illustrates a specific embodiment of a scheme to search for a gated pilot reference transmitted in accordance with IS-856 standard.

FIG. 4B illustrates a specific embodiment of a scheme to search for a gated pilot reference transmitted in accordance with IS-856 standard. In this embodiment, a number of data samples corresponding to 2144 chips (i.e., 2048+96 chips) are initially derived from the received signal and stored in a buffer. This time interval of 2144 chips is selected to ensure that two complete pilot bursts 410*a* and 410*b* are included in the samples, although the exact locations of the pilot bursts are not known. Some other time interval may also be processed and this is within the scope of the invention.

To search for the pilot reference within the 2144-chip interval, the data samples are correlated with each of a number of PN sequences that may have been used to generate the pilot reference. FIG. 4B shows the correlation of the data samples with one such PN sequence having a PN offset of 0.

Initially, PN bursts 412*a* and 412*b* are generated from the PN sequence starting at a PN chip index of 0, with each PN burst including 96 PN chips and the two PN bursts being separated by 1024 chips (i.e., the time duration between the start of consecutive pilot bursts). PN bursts 412*a* and 412*b* are first correlated with the data samples to derive a correlated value for PN chip index 0. PN bursts 412*a* and 412*b* are then shifted to the right by one chip position, and another cross-correlation is performed to generate another correlated value for PN chip index 1. In all, the cross-correlation and shift are performed 1024 times to derive 1024 correlated values for PN chip indices 0 through 1023.

PN bursts 414*a* and 414*b* are generated from the PN sequence starting at a PN chip index of 1024. PN bursts 414*a* and 414*b* are first correlated with the data samples to derive a correlated value for PN chip index 1024, then shifted to the right by one chip position, and correlated again with the data samples. In all, the cross-correlation and shift are performed 1024 times for PN bursts 414*a* and 4141*b* to derive 1024 correlated values for PN chip indices 1024 through 2047.

The PN bursts generation and correlation with the data samples are performed for 32 pairs of PN bursts for the PN sequence with the PN offset of 0. The 32 pairs of PN bursts are divided into four segments such that the first segment includes the first 8 pairs of PN bursts and corresponds to PN chip indices 0 through 8191, and the last segment includes the last 8 pairs of PN bursts and corresponds to PN chip indices 24,576 through 32,767. Each segment is associated with 8192 correlated values for the 8192 correlations between the data samples with the PN sequence at 8192 different chip offsets. These 32 pairs of PN bursts belong to one PN sequence (i.e., one code set) that may have been used to generate the pilot reference.

If a PN_INC of one is employed by the CDMA system, then any PN sequence with a PN chip index in increment of 64 chips may have been used to generate the pilot reference. Thus, the data samples are next correlated with a PN sequence having a PN offset of 1 (i.e., a PN sequence that starts at PN chip index of 64, as shown in FIG. 4B) in similar manner as that described above. In particular, for a PN sequence with PN offset of 1, the correlations are performed with 32 pairs of PN bursts having PN chip indices of 64, 1088, . . . and 31,808 (corresponding to PN offsets of 1, 17, . . . and 497). The data samples are next correlated with a PN sequence having a PN offset of 2 (i.e., a PN sequence that starts at PN chip index of 128). The correlation of the data samples with the PN sequences of other PN offsets continues in similar manner.

For a PN_INC of one, the data samples are correlated with 16 PN sequences having PN offsets of 0, 1, 2, 3, . . . , 14 and 15. PN sequences with higher PN offsets (i.e., 16, 17, and so on) may have also been used to generate the pilot reference at the access point. However, the correlations with PN sequences with these higher PN offsets are already performed by virtue of the correlations with the PN sequences with the lower PN offsets. For example, for a PN sequence with a PN offset of 16, the first PN burst starts at a PN chip index of 1024. However, this PN sequence has already been evaluated by PN bursts 414a and 414b belonging to the PN sequence with the PN offset of 0.

For a PN_INC of one, the entire "code space" to be searched is thus 16 code sets corresponding to 16 PN sequences with PN offsets of 0 through 15. Each code set includes 32,768 hypotheses for 32,768 PN chip offsets to be searched. Each code set may further be divided into four segments, with each segment including 8192 PN chip offsets.

If a PN_INC of two is employed by the CDMA system, then the entire code space to be searched is reduced to 8 code sets. This reduction results from the fact that only even PN offsets may be assigned to the access points (i.e., 0, 2, 4, ... and 510). The 8 PN sequences with PN offsets of 0, 2, 4, 6, 8, 10, 12, and 14 cover all possible even PN offsets for PN_INC of two.

Similarly, if a PN_INC of four is employed by the CDMA system, then the entire code space to be searched is further reduced to 4 code sets. This reduction results from the fact that only PN offsets of 0, 4, 8, 12, ... and 508 may be assigned to the access points, and that the four PN sequences with PN offsets of 0, 4, 8, and 12 cover all possible PN offsets for PN_INC of four.

As described above, for a CDMA system that transmits a gated pilot reference, a larger code space needs to be searched to find and acquire the pilot reference. Moreover, the size of the code space is dependent on the particular value of PN_INC employed by the CDMA system, with a PN_INC of one resulting in the largest code space that needs to be search to find a pilot reference. If the CDMA system utilizes PN_INC=4, the overall code space to be searched is 4×32,768 chips (or effectively 4 PN sequences of length 32,768). And if the system utilizes PN_INC=1, the overall code space to be searched is 16×32,768 chips.

Aspects of the invention provide techniques to search and acquire a gated pilot reference in a manner to achieve faster acquisition time and a high probability of detection. In one aspect, the overall code space to be searched is divided into groups of code sets and the groups are searched such that PN sequences more likely to be used to generate the pilot reference are searched first, and PN sequences least likely to be used are searched last. Mechanisms are provided to terminate the acquisition process early upon acquisition of pilot references in the more likely used code space.

Figure 5:
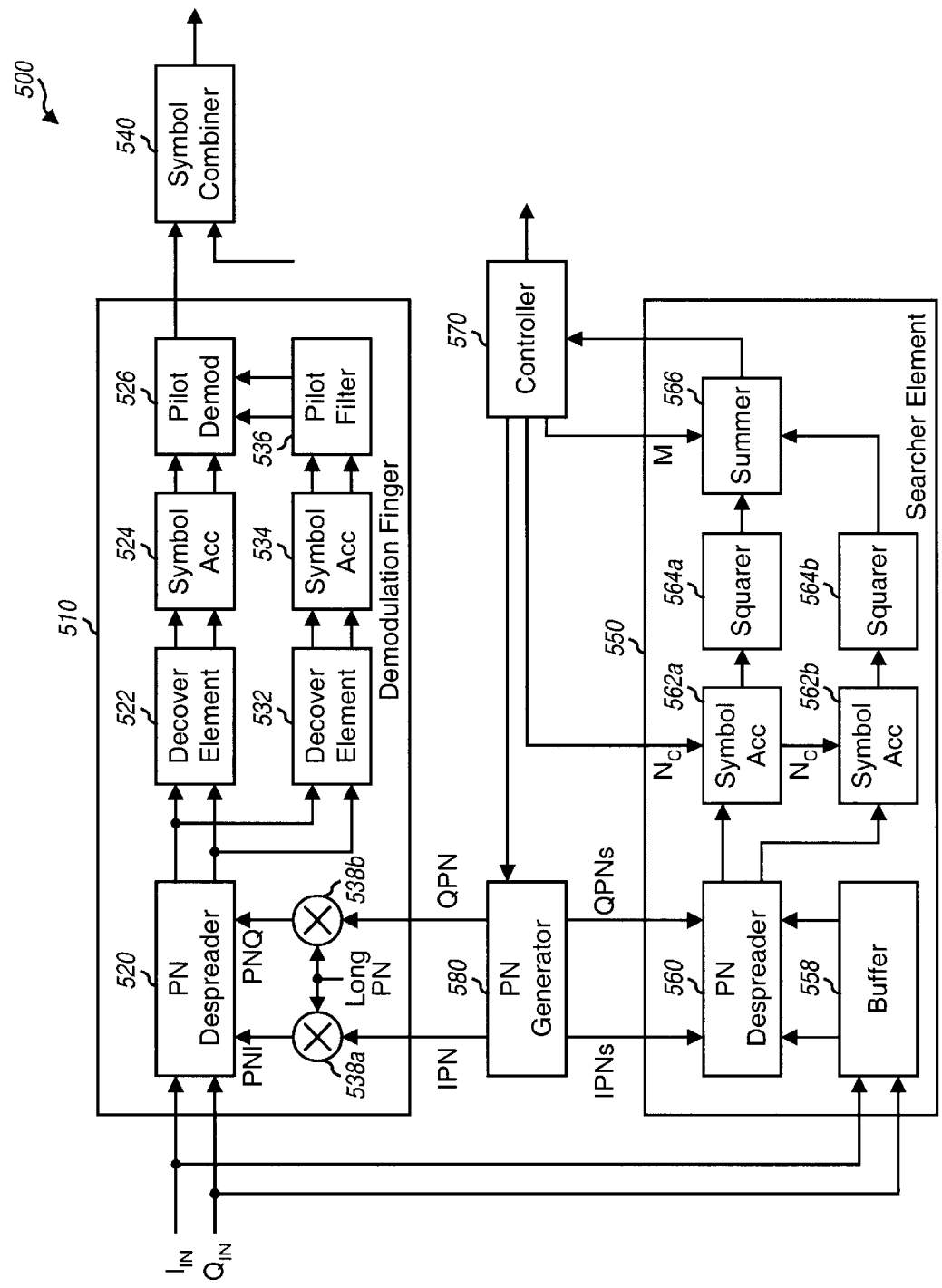
FIG. 5 is a block diagram of an embodiment of a receiver that may be used to search for pilot references.

In another aspect, a multi-step pilot acquisition scheme is provided to search for and acquire pilot references, and some of the steps are pipelined to shorten the search time. A multi-stage pilot search scheme is also provided to search for pilot references using multiple (e.g., two) stages, wherein a different set of search parameter values may be used for each stage to improve the likelihood pilot acquisition for different operating conditions. The multi-stage pilot search scheme may advantageously incorporate the search by groups and the pipelining described above. These aspects are described in further detail below FIG. 5 is a block diagram of an embodiment of a receiver 500 that may be used to search for pilot references. Receiver 500 includes a number of finger processors 510 (only one is shown for simplicity) that may be assigned to process strong instances of a received signal (i.e., multipaths) and a searcher 550 used to search for pilot references. The operation of finger processors 510 is described in detail in U.S. Pat. Nos. 5,764,687 and 5,490,165.

Searcher element 550 operates in conjunction with a controller 570 and a PN generator 580. As shown in FIG. 5, the received $I_{IN}$ and $Q_{IN}$ samples from a front-end unit (not shown) are provided to a buffer 558 that stores the samples for subsequent processing by searcher 550. The stored $I_{IN}$ and $Q_{IN}$ samples are then provided to a PN despreader 560 that also receives a complex PN sequence, IPNs and QPNS, from PN generator 580. The complex PN sequence has a specific phase (or chip offset) corresponding to the hypothesis being searched, which may be determined by controller 570.

PN despreader 560 performs a complex multiply of the complex $I_{IN}$ and $Q_{IN}$ samples with the complex IPNs and QPNs sequence and generates complex despread IDES and QDES samples. This complex multiply is complementary to that performed at the access point.

For many CDMA systems, the pilot reference is transmitted on code channel zero (i.e., covered with an orthogonal code of zero), and no decovering is thus needed at the terminal. The despread IDES and QDES samples are then provided to symbol accumulators 562a and 562a, respectively, each of which accumulates a particular number of despread samples corresponding to $N_C$ chips. Symbol accumulator 562a and 562b provide the accumulated results, $I_{ACC}$ and $Q_{ACC}$, to squarers 564a and 564, respectively, which squares the results. A summer 566 then receives the squared results, $IACC^2$ and $QACC^2$, from squarers 564a and 564b, sums each pair of squared results to generate a sum of squares (i.e., $IACC^2+QACC^2$) Summer 566 further accumulates M sums of squares to generate a correlated value that is then provided to controller 570.

The design and operation of receiver 500 for an CDMA system is described in further detail in the aforementioned U.S. Pat. Nos. 5,764,687 and 5,490,165.

Searcher 550 correlates the data samples with a complex PN sequence. To search for pilot references, the PN sequence is swept across a range of chip offsets, with each chip offset corresponding to a hypothesis being searched. The cross-correlation of the data samples with the PN sequence produce a low value (or zero, ideally) except when the phase of the PN sequence is aligned with that of a pilot reference in the data samples.

The parameter $N_C$ represents the number of chips for coherent integration, and the parameter M represents the number of time intervals for non-coherent integration. These parameters determine the performance of the pilot detection, which may be quantified by the probability of detecting a pilot reference at various signal qualities (i.e., Io/No). Different sets of parameter values may be more suited for different operating conditions. For example, if the terminal's locally generated sampling clock (which is used to sample the received signal to generate the receive samples) is off in frequency by more than one part per million (ppm) from that of the clock used to generate the pilot reference at the access point, then a shorter integration interval (e.g., parameter values of $N_C$=48 and M=4) may provide better performance. Conversely, if the local clock is off in frequency by less than one ppm, then a longer integration interval (e.g., parameter values of $N_C$=96 and M=2) may provide better performance.

Controller 580 controls and coordinates the operation of searcher 550 and PN generator 580 in the search for pilot references. Controller 580 may be operated to provide the parameters $N_C$ and M to searcher 550, determine which portions of the data samples should be processed, and direct PN generator 580 to generate PN sequences at various chip offsets. Controller 580 may further be operated to process the correlated values from summer 566 based on a particular pilot search scheme to determine whether or not pilot references are present in the data samples and at what chip offsets.

Various schemes may be used to detect pilot references. In one scheme, a sequential search over the entire code space is performed, and the first pilot reference found above a particular threshold is provided as the detected pilot reference. This scheme may not provide the best (strongest) pilot reference. In another scheme, the entire code space is swept during a pre-detection step, and a set of candidate peaks found during the pre-detection is re-evaluated during a dwell step to find the best peak. Various aspects of the invention may be implemented using any number of pilot search schemes. For clarity, various aspects are described herein for the scheme whereby the entire code space is swept and candidate peaks are re-evaluated to find the best peak.

Figure 6:
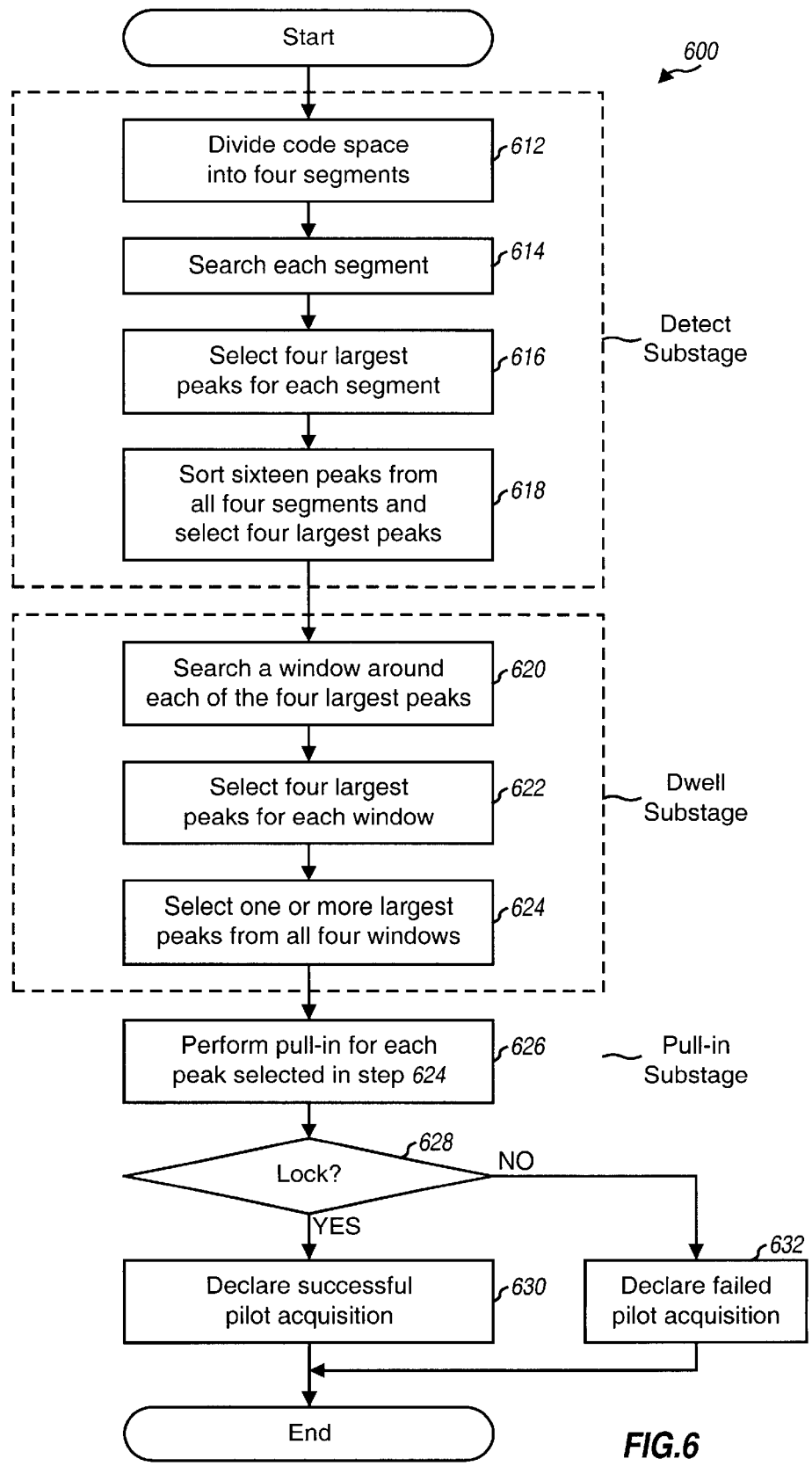
FIG. 6 is a flow diagram of an embodiment of a process to search for a gated pilot reference in a defined code space.

FIG. 6 is a flow diagram of an embodiment of a process 600 to search for a gated pilot reference in a defined code space. In an embodiment, the code space includes one code set of 32,768 chip offsets, which correspond to 32,768 hypotheses to be evaluated. Initially, the code space is divided into four non-overlapping segments, with each segment including 8192 chip offsets, at step 612. Each segment is then searched, at step 614, and the four largest peaks are selected, at step 616. The 16 largest peaks from all four segments are then sorted, and the four largest peaks after the sort are selected, at step 618.

At step 620, a search is then performed for a window around each of the four peaks selected in step 618. This window includes a smaller number of chip offsets than the segment (e.g., 16 chip offsets). For each of the four windows searched, one or more (e.g., four) largest peaks are selected, at step 622. The largest peaks from all four windows are then sorted, and one or more largest peaks after the sort are selected, at step 624. Typically, only one largest peak is selected, but two or four or some other number of largest peaks may also be selected.

At step 626, a demodulator is then assigned to attempt to lock in frequency and phase to each of the largest peaks selected in step 624. It may be preferable to perform the pull-in on only one largest peak, since frequency error is combined. If more than one peak are considered for pull-in, these peaks may not be associated with real signal paths, or the signal paths may be associated with different Doppler frequency errors. If an individual frequency tracking loop is not used for each peak, it may not be optimal to combine the paths in during pull-in. Thus, pull-in may be more advantageously performed on only one largest peak from step 624.

If lock to the peak is achieved, as determined in step 628, then a successful pilot acquisition is declared, at step 630. Otherwise, a failure is declared at step 632 and other actions are performed, as described below. In either case, the process terminates.

In FIG. 6, steps 612 through 618 comprise a "detect" substage, steps 620 through 624 comprise a "dwell" substage, and step 626 represents a "pull-in" substage. In one specific embodiment, the parameter values for the detect substage are $N_C=96$, $M=2$, and $W_S=8192$, where $W_S$ is the search window size (in number of PN chip offsets), and the parameter values for the detect substage are $N_C=96$, $M=2$, and $W_S=16$.

As described above, for a gated pilot reference, a larger code space needs to be searched, with the size of the code space being dependent on the value for PN_INC. For PN_INC 4, the overall code space to be searched is 4×32,768 chip offsets, and for PN_INC=, the overall code space to be searched is 16×32,768 chip offsets. Each group of 32,768 chip offsets corresponds to a code set.

Although the IS-856 standard specifies a minimum PN_INC of 1, it is anticipated that many CDMA systems will actually employ a PN_INC of 4 or possibly 2. Thus, in an aspect, the overall code space to be searched is divided into non-overlapping code sets of 32,768 chip offsets, and the code sets corresponding to more likely used PN_INC values may be searched first.

For PN_INC of 1, the entire code space to be searched can be divided into 16 code sets. These 16 code sets may be assembled into four groups, with each group including four code sets of certain PN chip offsets (i.e., PN_OFFSET). These four groups may be defined as follows:

G1=PN_OFFSET 0 . . . 16 . . . 32 . . . ; 4 . . . 20 . . . 36 . . . ; 8 . . . 24 . . . 40 . . . ; and 12 . . . 28 . . . 44 . . .
G2=PN_OFFSET 2 . . . 18 . . . 34 . . . ; 6 . . . 22 . . . 38 . . . ; 10 . . . 26 . . . 42 . . . ; and 14 . . . 30 . . . 46 . . .
G3=PN_OFFSET 1 . . . 17 . . . 33 . . . ; 5 . . . 21 . . . 37 . . . ; 9 . . . 25 . . . 41 . . . ; and 13 . . . 29 . . . 45 . . .
G4=PN_OFFSET 3 . . . 19 . . . 35 . . . ; 7 . . . 23 . . . 39 . . . ; 11 . . . 27 . . . 43 . . . ; and 15 . . . 31 . . . 47 . . .

Using the above grouping of code sets, group G1 comprises the entire code space for PN_INC=4, groups G1 and G2 comprise the entire code space for PN_INC=2, and all four groups comprise the entire code space for PN_INC=1. If PN_INC=4 is the most likely to be used for CDMA systems, PN_INC=2 is the next most likely to be used, and PN_INC=1 is the least likely to be used, then the groups may be searched in the following order: G1 followed by G2, followed by G3 (or G4), and followed by G4 (or G3).

With the group defined as described above, to search for the PN_INC most likely to be used for CDMA systems (i.e., PN_INC=4), it is only necessary to search the code space defined by G1. And to search for the PN_INC next most likely to be used (i.e., PN_INC=2), it is only necessary to additionally search the code space defined by G2 (i.e., G1 plus G2, total). The remaining G3 and G4 may additionally be searched for PN_INC of one. If the PN_INC is not known a priori, then all four groups may be searched in the order described above. However, a pilot search stage may also be defined that only searches for group G6, or only groups G1 and G2, and then terminates. This stage may be used, for example, on the most recently used channel or under "system loss" exit conditions.

By grouping the code sets in the manner described above and searching the groups in a particular order (G1, G2, G3, then G4), the most likely PN chip offsets are searched first and the least likely PN chip offsets are searched last. In this manner, the chances of acquiring a pilot reference (and the system) may be achieved in less time.

The pilot search process shown in FIG. 6 may be modified to search a code space comprised of four code sets. In an embodiment, each code set is divided into four segments, with each segment including 8192 chip offsets as described above. Each segment is searched and four largest peaks are selected for the segment. A total of 64 peaks are provided for the 16 total segments of the four code sets. Of these 64 peaks, the 16 largest peaks are selected as the output from the detect substage.

For the dwell substage, a window around each of the 16 peaks is searched, and one or more (e.g., four) peaks are provided for each window. Of the (e.g., 64) peaks provided for the 16 windows, one or more largest peaks are selected as the output from the dwell substage. Pull-in is then attempted on each of the largest peaks from the dwell substage to determine whether or not a pilot reference has been acquired.

The specific details provided above are illustrative of a specific implementation. In general, the entire code space (e.g., each group of code sets) may be searched based on various implementations and parameter values. The code space to be searched may be partitioned into any number of segments, any number of peaks may be selected for each segment for the detect substage, any window size may be used, any number of peaks may be selected for each window for the dwell substage, and any search parameter values (i.e., $N_C$ and M) may be used. For example, the entire code space may be searched (i.e., one segment), 16 largest peaks may be provided as the output from the detect substage to the dwell substage, and the largest peak found in the dwell substage may be provided for pull-in.

The partitioning of the entire code space into four groups and the searching of one group at a time (instead of searching over all four groups) also decrease the time between the detect and dwell substages, which may improve performance for some operating environment. For a mobile terminal, the received signal may fade in and out as the terminal moves about, depending on whether the multipaths add constructively or destructively. If a relatively long time period elapse between the detect and dwell substages, the two substages may be subject to independent fading and non-correlated signal segments may be searched under certain type of fading assumptions. This in turn reduces the overall probability of detecting the pilot reference. It is therefore desirable to perform the dwell substage as close in time as possible to the detect substage, to ensure that correlated fading statistics are used in both measurements.

By dividing the entire code space for PN_INC=1 into four groups and searching one group at a time (instead of the entire code space), the detect time is shortened by a factor of four, which is highly desirable for a fading environment. To further reduce the time between the detect and dwell substages, a search may be performed on one code set at a time in each the group. This may be achieved using the process shown in FIG. 6. This scheme may further shorten the time between the detect substage and the dwell substage by another factor of four. The size of the code space to be searched and various other parameters (e.g., the number of peaks to select for each substage) may affect the probability of detecting the pilot reference, and these parameters may be adjusted to obtain the desired performance.

A pilot search scheme may be designed to achieve a set of goals, which may include (1) high performance, as quantified by faster acquisition speed and high probability of detection, and (2) the ability to acquire pilot references when a PN_INC of one is used, but provide shorter acquisition time when the more likely PN_INC of four or two is used. One example of such a pilot search scheme is provided below.

An aspect of the invention provides a multi-stage pilot search scheme capable of achieving the above-stated goals. Each stage is optimized for and searches the entire code space based on certain assumptions of the operating environment. In many instances (which may account for the majority of the pilot acquisition cases in an HDR system), the received pilot strength is relatively strong (e.g., −8 dB Ior/No or better) and the local sampling clock has a small a frequency error (e.g., less than one ppm). Thus, if two stages are employed, a first stage may be designed such that it is sensitive enough to quickly acquire pilot references under the more common operating conditions of strong pilot strength and small frequency error, and a second may be designed with improved sensitivity to acquire pilot references for the less common cases of low pilot strength and/or large frequency error.

A multi-stage pilot search scheme provides several advantages. First, a different set of parameter values may be used for each of the multiple stages, which may improve the likelihood of pilot acquisition. The different sets of parameter values may be selected such that the pilot detection probability is greater for different operation conditions, which may correspond to a fading or AWGN environment, large or small frequency offsets in the sampling clock, and so on. Second, time diversity is also provided since each stage searches for the pilot reference over a different time period. This time diversity is especially beneficial for a fading environment.

Figure 9:
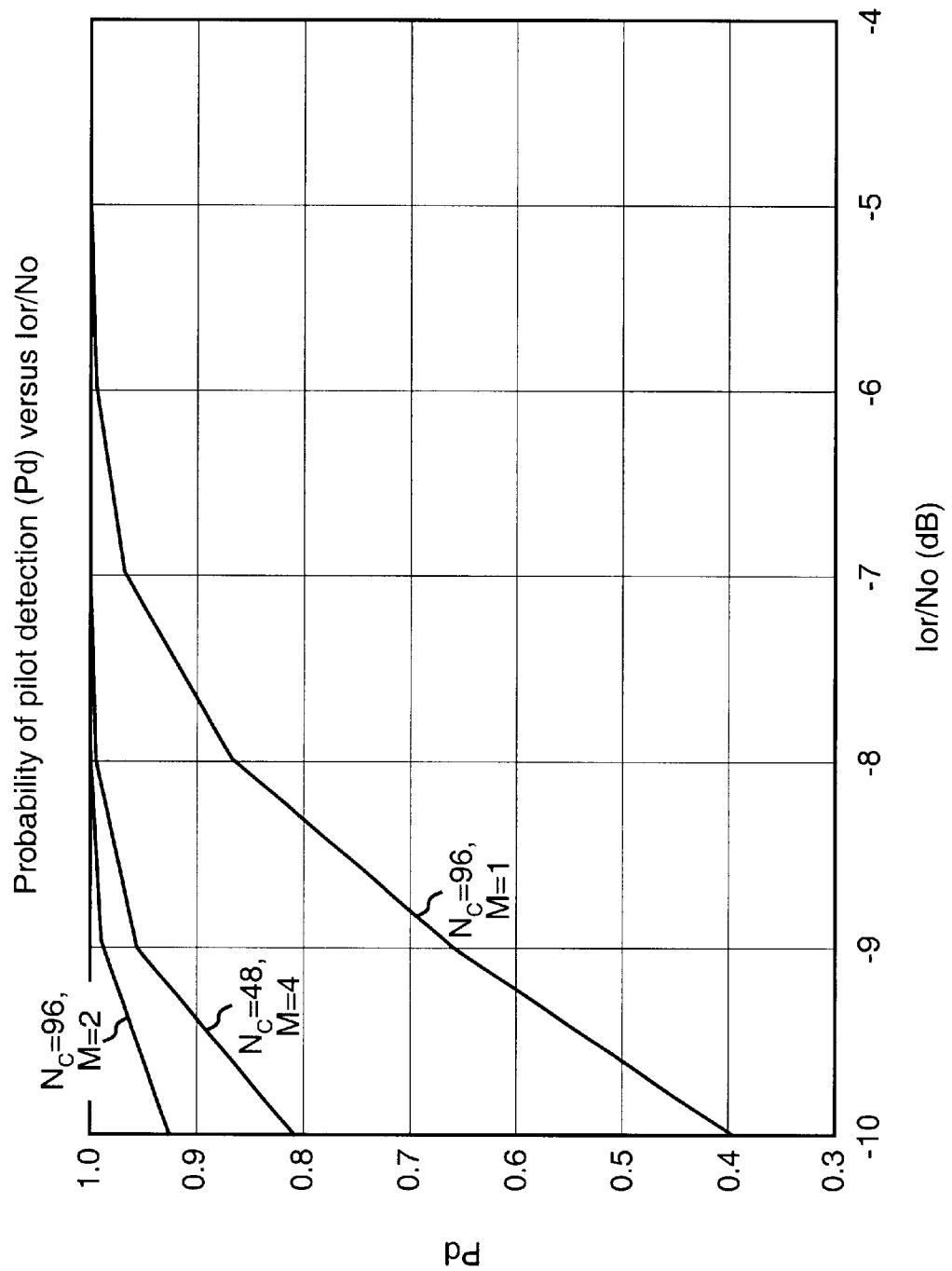
FIG. 9 shows plots of the probability of pilot detection (Pd) versus received signal quality (Ior/No) for three sets of search parameter values.

FIG. 9 shows three plots of the probability of pilot detection (Pd) versus received signal quality (Ior/No) for three sets of search parameter values. From the pilots, the probability of pilot detection is approximately 0.87 (i.e., Pd=0.87) at −8 dB Ior/No for parameter values of $N_C$=96 and M=1, and the probability of pilot detection is approximately 0.99 at the same Ior/No for parameter values of $N_C$=48 and M=4. In a specific embodiment, the first stage may be designed to operated with $N_C$=96 and M=2, and the second stage may be designed to operated with $N_C$=48 and M=4. The overall pilot detection with these two stages is approximately better than 0.999. These are simulated results and actual performance will likely differ. In another specific embodiment, both stages may be designed to operate with $N_C$=48 and M=4.

Each stage may also be designed to first search the code space for the most likely used PN_INC of four, followed by the code space for the next most likely used PN_INC of two, and followed by the code space for the least likely used PN_INC of one. This can be achieved by partitioning the entire code space of PN_INC=1 into 16 code sets, assembling the code sets into four groups, and searching each group in order, as described above.

In an aspect, to further reduce the time to search and acquire pilot references, the detect/dwell substage for one group and the pull-in substage for another group may be performed in parallel in a pipelined manner. Referring back to FIG. 5, the detect and dwell substages may be performed by searcher 550, and the largest peak for a particular dwell substage may be provided to demodulator finger 510 for pull-in. Since two different elements are used for the detect/dwell substages and the pull-in substage, these elements may be operated in a pipelined manner, as described below.

Figure 7:
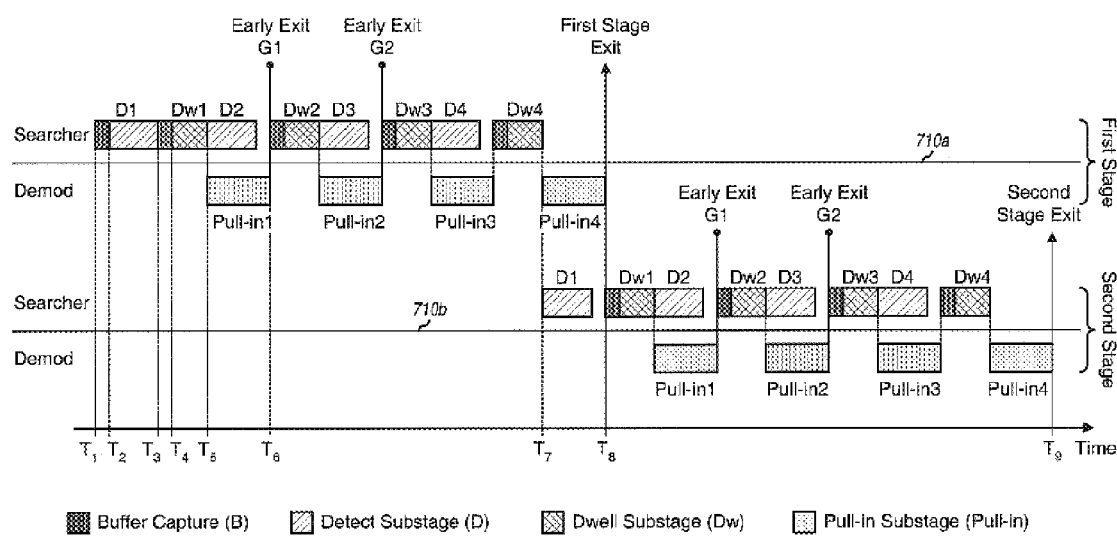
FIGS. 7 and 8 illustrate a two-stage pilot search scheme with early termination upon pilot acquisition, in accordance with two embodiments of the invention.

FIG. 7 illustrates a two-stage pilot search scheme with early termination upon pilot acquisition, in accordance with an embodiment of the invention. This two-stage pilot search scheme may be used to acquire a particular CDMA channel. For clarity, the processing for the first stage is shown at the top of FIG. 7 along a line 710a, and the processing for the second stage is shown below that along a line 710b. Also for clarity, the processing performed by the searcher is shown above lines 710, and the processing performed by the demodulator finger is shown below lines 710.

Initially, at time $T_1$, the buffer (e.g., buffer 558 in FIG. 5) is loaded with samples derived from the received signal and corresponding to a particular time interval, as shown in FIG. 4B. At time $T_2$, the detect substage (D1) is performed on the four code sets belonging to group G1. In an embodiment, the parameter values used for this substage are as follow: $N_C$=96, M=2, and $W_S$=8192. In an embodiment, four largest peaks are collected from each segment ($W_S$=8192), resulting in 64 total peaks for group G1. The peaks are then sorted by strength and the 16 largest peaks are selected and provided to the dwell substage.

At time $T_3$, the buffer is loaded with new samples for the dwell substage (Dw1). The detect substage (D1) generates a number of noise peaks, some of which may be comparable in magnitude or may be even larger than the peaks for the pilot reference. If the noise is random and independent (i.e., uncorrelated), then the correlation of the PN sequence over another set of samples will likely reduce the number of noise peaks and the likelihood of large noise peaks occurring in the same locations.

At time $T_4$, the dwell substage (Dw1) is then performed on 16 windows centered about the 16 peaks from the detect substage (D1). In an embodiment, the parameter values used for this substage are as follow: $N_C=96$, $M=2$, and $W_S=16$. In an embodiment, two largest peaks are collected from each window, resulting in 32 total candidate peaks for group G1. The peaks are then sorted by strength, and one or more largest peaks are selected and provided to the pull-in substage.

At time $T_5$, pull-in substage (Pull-in 1) is performed on one or more largest peaks provided from the dwell substage (Dw1). In one embodiment, the pull-in is performed on only the largest peak from group G1. In another embodiment, the pull-in is performed on $N_P$ largest peaks from group G1 by $N_P$ demodulator fingers, where $N_P$ may be two, four, or any other integer greater than one. Pull-in of multiple peaks concurrently may provide improved performance. However, other factors may need to be considered if the pull-in is concurrently performed on multiple peaks, as described below. The demodulator finger(s) assigned to perform the pull-in are loaded with the appropriate samples for the pull-in processing.

While the pull-in is performed on the peak(s) from group G1, the detect substage (D2) is performed on the four code sets belonging to group G2. In this manner, the detect substage for one group (e.g., G2) may be pipelined with the pull-in substage for another group (e.g., G1), which reduces the time required for the pilot search for PN_INC of two or one. In an embodiment, the detect substage (D2) for group G2 is performed on the same set of samples used for the dwell substage (Dw1) for group G1.

The pull-in substage for the peak(s) in group G1 typically adjusts the frequency and phase of the sampling clock, which may be provided by a temperature compensated crystal oscillator (TCXO). This phase/frequency adjustment is directed by a frequency tracking loop, which may be implemented in a manner known in the art.

At time $T_6$, the pull-in substage for group G1 is completed. If pilot acquisition is declared by the pull-in substage, then all subsequent events may be aborted and the processing terminates with a channel-acquired indication. Alternatively, if the pull-in substage was not successful in locking to the largest peak(s), a failure for group G1 is declared and the frequency tracking loop may be reset to its original state, as if the pull-in for group G1 was never performed. For example, the value for a frequency accumulator may be reloaded with a value from a table. Early termination of the acquisition process after the pull-in substage for group G1 allows for a shortened search time if PN_INC of four is employed. However, if a failure is declared, it is only for group G1 and not the entire code space for the CDMA channel.

After the detect substage (D2) for group G2 is completed and after the frequency tracking loop has been reset, the buffer for the searcher is loaded with samples for the dwell substage (Dw2). The adjustment to the sampling clock by the pull-in substage may affect the performance of the dwell substage (Dw2), and thus the searcher buffer is updated after the pull-in substage is completed and not while it is in progress. The loading of the buffer for the dwell substage (Dw2) is then dependent on the length of time required for both the detect substage (D2) and the pull-in substage (Pull-in). In the example shown in FIG. 7, the pull-in substage requires a longer time period than the detect substage, and the buffer is loaded after the pull-in substage is completed.

The detection, dwell, and pull-in substages for each of groups G2, G3, and G4 continue in similar manner as that described above for group G1. After the completion of the pull-in substage for group G2, pilot acquisition may be declared, in which case all subsequent events may be aborted and the processing terminates with a channel-acquired indication. This early termination of the acquisition process after the pull-in substage (Pull-in2) for group G2 allows for a shortened search time if PN_INC of two is employed.

At time $T_7$, pull-in is performed on one or more largest peaks provided from the dwell substage (Dw4) for group G4. The time $T_7$ also indicates the start of the second stage. Thus, while the pull-in is performed on the peak(s) from group G4 of the first stage, the processing for the second stage commences and the detect substage (D1) is performed on group G1. In an embodiment, the parameter values used for the detect substage of the second stage are as follow: $N_C=48$, $M=4$, and $W_S=8192$.

At time $T_8$, the pull-in substage for group G4 is completed. If pilot acquisition is declared by the pull-in substage, then all subsequent events for the second stage may be aborted and the processing terminates with a channel-acquired indication. Alternatively, if the pull-in substage was not successful, a failure for group G4 is declared and the buffer for the searcher is loaded with samples for the dwell substage (Dw1) after the frequency tracking loop is reset to its original state, as described above. The dwell substage is then performed for group G1 using the following parameter values: $N_C=48$, $M=4$, and $W_S=16$.

The processing for the second stage proceeds in similar manner as that described above for the first stage. Again, pilot acquisition may be declared after the pull-in substage for group G1 (for early termination if PN_INC=4 is employed) or after the pull-in substage for group G2 (for early termination if PN_INC=2 is employed).

At time $T_9$, the pull-in substage for group G4 for the second stage is completed, the pilot acquisition results are provided, and the two-stage pilot search process terminates.

The two-stage pilot search scheme shown in FIG. 7 searches through all four groups in the first stage prior to searching through the same four groups in the second stage. The search process may be rearranged to perform the search in different order such that improved search time may be achieved for some situations.

Figure 8:
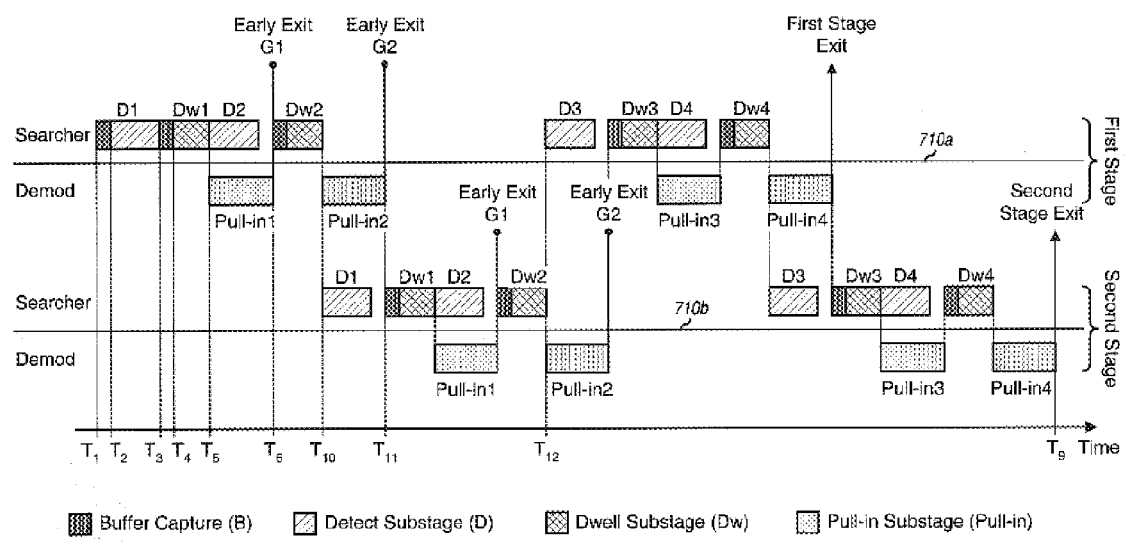

FIG. 8 illustrates a two-stage pilot search scheme with emphasis on groups G1 and G2 for PN_INC of four and two, in accordance with an embodiment of the invention. If PN_INC of four or two is more likely to be used, then groups G1 and G2 may be more thoroughly searched prior to searching through the remaining groups G3 and G4.

As shown in FIG. 8, the detect, dwell, and pull-in substages for groups G1 and G2 for the first stage are performed in similar manner as that described in FIG. 7. However, at time $T_{10}$, the detect substage (D1) for group G1 for the second stage is performed concurrently with the pull-in substage for group G2 for the first stage. At time $T_{11}$, after the completion of the pull-in substage for group G2 for the first stage and if pilot acquisition was not declared, the buffer for the searcher is loaded with new samples and the dwell substage (Dw1) for group G1 for the second stage is performed. The detect, dwell, and pull-in substages for groups G1 and G2 are thus performed for the second stage immediately following the first stage. At time $T_{12}$, the search for groups G3 and G4 commences and the detect substage (D3) for group G3 for the first stage is performed concurrently with the pull-in substage for group G2 for the second stage. The processing proceeds in similar manner for groups G3 and G4 thereafter.

Other search order may also be devised and are within the scope of the invention. For example, the first and second stages may be performed for group G1, followed by the first and second stages for group G2, followed by the first and second stages for groups G3 and G4. This search order would provide even faster acquisition time for PN_INC of four.

If all four groups G1 through G4 are searched sequentially without pipelining, then the acquisition time for the each stage may be approximated as:

$$T_{ACQ} \approx 4 \cdot (T_{DET} + T_{PULL-IN}), \text{ without pipelining.}$$

In the above estimate, the time to load the searcher buffer and the dwell time are ignored since these are typically much smaller than the detect and pull-in times. If early termination is allowed after a successful search through group G1, then the acquisition time for pilot acquisition may be approximated as:

$$T_{ACQ} = (T_{DET} + T_{PULL-IN}).$$

If early termination is allowed after a successful search through groups G1 and G2, then the acquisition time for pilot acquisition may be approximated as:

$$T_{ACQ} \approx 2 \cdot (T_{DET} + T_{PULL-IN})$$

Thus, early termination of a successful pilot acquisition provides a saving of approximately $3 \cdot (T_{DET} + T_{PULL-IN})$ or $2 \cdot (T_{DET} + T_{PULL-IN})$ If pipelining is used and the detect substage is shorter than the pull-in substage, then the acquisition time for the each entire stage may be approximated as:

$$T_{ACQ} = T_{DET} + 4 \cdot T_{PULL-IN}, \text{ with pipelining and } T_{DET} < T_{PULL-IN}.$$

And if pipelining is used and the detect substage is longer than the pull-in substage, then the acquisition time for the each entire stage may be approximated as:

$$T_{ACQ} = 4 \cdot T_{DET} + T_{PULL-IN}, \text{ with pipelining and } T_{DET} > T_{PULL-IN}.$$

Thus, pipelining provides a saving of the shorter of $3 \cdot T_{DET}$ or $3 \cdot T_{PULL-IN}$ over no pipelining.

The possible improvement in acquisition time may be quantified for a pilot search scheme that (1) defines the groups of code sets and searches the groups in the order shown in FIG. 7, and (2) pipelines the detection and pull-in substages. For this example, the times required to perform the detect, dwell, and pull-in substages and to load the searcher buffer are as follows:

Buffer load time=2.5 msec

Detect time=300 msec (first stage, with $N_C$=96, M=2, and $W_S$=8192)

Detect time=335 msec (second stage, with $N_C$=48, M=4, and $W_S$=8192)

Dwell time=0.3 msec

Pull-in time=848 msec for Ior/No of −8 dB or less

=424 msec for Ior/No of −8 dB to −5 dB

=212 msec for Ior/No of −5 dB to −2 dB

=106 msec for Ior/No of −2 dB or better.

Table 1 lists the acquisition times for various termination points in FIG. 7 for various signal qualities (Ior/No) for a specific set of parameter values (e.g., $N_C$=96 and M=2). The second through seventh columns list the acquisition times for a termination after the search for (1) group G1 for the first stage (the first "Early Exit G1" in FIG. 7), (2) groups G1 and G2 for the first stage (the first "Early Exit G2"), (3) all four groups for the first stage ("First Stage Exit"), (4) group G1 for the second stage (the second "Early Exit G1"), (5) groups G1 and G2 for the second stage (the second "Early Exit G2"), and (6) all four groups for the second stage ("Second Stage Exit"). The acquisition times shown in Table 1 are derived based on the times notes above and the two-stage pilot search scheme shown in FIG. 7. For comparison, the acquisition times for the entire first stage would be approximately 1648 msec, 12072 msec, and 2920 msec, and 4616 msec for Ior/No of −2 dB or better, −2 to −5 dB, −5 to −8 dB, and −8 dB or better, respectively, if no pipelining is used.

TABLE 1

| Ior/No | First Stage | | | Second Stage | | |
|---|---|---|---|---|---|---|
| | G1 | G1 & G2 | G1–G4 | G1 | G1 & G2 | G1–G4 |
| <−8 dB | 1154 | 2006 | 3709 | 4561 | 5412 | 7115 |
| −8 to −5 dB | 730 | 1157 | 2010 | 2437 | 2864 | 3718 |
| −8 to −2 dB | 518 | 823 | 1433 | 1768 | 2106 | 2773 |
| >−2 dB | 412 | 726 | 1326 | 1649 | 1987 | 2663 |

In the above example, the dwell substage takes a small amount of time in comparison to the times for the detect and pull-in substages. Because the detect and pull-in substages dominate the time required for acquisition, greater time saving is achieve by pipelining these two substages. As shown in FIG. 7, the time at which the searcher buffer may be loaded for the dwell substage (e.g., at time $T_6$) is determined by the longer of the pull-in time and the detect time.

Since the detect and pull-in substages are pipelined, the times for these two substages may be designed to approximately match one another. In the above example, the pull-in time ranges from 106 msec to 848 msec depending on the signal Ior/No. If the pull-in time is longer than 300 msec on the average, then the detect substage may be designed to utilize more of this time period. For example, to achieve a 300 msec detect time, the parameter values for the detect stage may be selected as: $N_C$=96, M=2, and $W_S$=8192, which then improves the probability of pilot detection, as shown in FIG. 9. In another design, if the pull-in time is 150 msec or less on the average, then a detect time of 150 msec may provide better performance, and may be achieved with the parameter values of $N_C$=96, M=1, and $W_S$=8192.

The parameters $N_C$ and M are typically selected to optimize pilot acquisition, which may be quantified by the average acquisition time. This average acquisition time is dependent on (1) the probability of detecting the pilot and (2) the time required to perform the pilot search process. Both of these factors are dependent on the parameters $N_C$ and M.

A pilot reference may be acquired slower on the average even with a faster first stage. As an example, consider a pilot reference at −8 dB Ior/No. If the parameter values of $N_C$=96 and M=1 are used, the probability of detecting the pilot in the first stage is 0.87, the overall probability is 0.9987, and the acquisition time is $T_{ACQ} = 0.87 \cdot 580 + 0.13 \cdot 2287 = 802$ msec.

And if the parameter values $N_C=96$ and $M=2$ are used, the probability of detecting the pilot in the first stage is 0.998, the overall probability is 0.9999, and the acquisition time is:

$T_{ACQ} = 0.998 \cdot 730 + 0.002 \cdot 2437 = 733$ msec.

Thus, the average pilot acquisition is actually faster with the slower but more sensitive detector ($N_C=96$ and $M=2$) for the first stage because of the higher probability of pilot detection. Thus, it may be preferable to use the parameter values of $N_C=96$ and $M=2$ (instead of $N_C=96$ and $M=1$) for the first stage and $N_C=48$ and $M=4$ for the second stage. In a fading environment, the second stage is typically used more often, and the loss in the average acquisition time may be more pronounced with the reduced sensitivity stage (i.e., $M=1$).

The elements of the terminals may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof. The functions and processing described herein may also be implemented with software executed on a processor or a combination of software and hardware. For example, the pilot acquisition may be performed based on a hardware searcher under the control of a controller, or by program codes executed on a processor (controller 570 in FIG. 5), or by some other mechanisms.

For clarity, various aspects and embodiments of the invention have been described for a CDMA system that conforms to the IS-856 standard. These aspects and embodiments may also used for other wireless communication systems that transmit a gated pilot reference. Examples of such systems include CDMA systems that conform to cdma2000 and W-CDMA standards.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of acquiring a gated pilot signal in an expanded PN space split into a plurality of N non-overlapping groups of specific pilot offsets, wherein the N groups are defined such that when PN_INC=max, a search of only a first of the N groups is necessary for acquisition of the gated pilot signal, while when PN_INC<max, a search of N or fewer groups is necessary for acquisition of the gated pilot signal, the method comprising:

if PN_INC=max, searching only the first group to identify the gated pilot signal;

if PN_INC<max, searching at least the first group to identify the gated pilot signal, but fewer than N groups; and identifying the gated pilot signal from the searched groups, wherein the first group contains all possible specific pilot offsets for PN_INC=max.

2. The method of claim 1, wherein N is four and max is fours and wherein a second group contains all possible specific pilot offsets for PN_INC=2 not contained with the first group.

3. The method of claim 2, wherein each of the specific pilot offsets in the first group is either 0 or a multiple of 4.

4. The method of claim 3, wherein each of the specific pilot offsets in a second group is a multiple of 2, but not of 4.

5. The method of claim 1, wherein the searched groups are searched in parallel.

6. The method of claim 1, wherein the searched groups are searched sequentially.

7. The method of claim 1, wherein the expanded PN space is an integer multiple of 32,768 chips, where the integer multiple is greater than one.

8. The method of claim 1, wherein the gated pilot signal conforms to IS-856 standard.

9. The method of claim 1, further comprising:

if the gated pilot signal is not identified after searching at least the first group, searching a last group of the N groups.

10. A method for acquiring a gated pilot reference in a wireless communication system, comprising:

partitioning an overall code space in which the pilot reference may be found into a plurality of groups of codes, a first group of codes comprising code sets corresponding to all possible specific pilot offsets for PN_INC=max;

ordering the plurality of groups based on likelihood of detecting the pilot reference in each of the groups;

searching for the pilot reference in accordance with the ordered groups; and terminating the searching upon acquisition of the pilot reference.

11. The method of claim 10, wherein each code corresponds to a particular chip offset of a pseudo-noise (PN) sequence used to generate the pilot reference.

12. The method of claim 11, wherein the overall code space is partitioned into four groups.

13. The method of claim 12, wherein each of the specific pilot offsets in the first group is either 0 or a multiple of 4.

14. The method of claim 13, wherein each of the specific pilot offsets in a second group is a multiple of 2, but not of 4.

15. The method of claim 11, wherein each group includes a plurality of code sets and each code set is representative of a specific PN sequence with a particular offset.

16. The method of claim 15, wherein the plurality of groups include a first group of code sets most likely to be used to generate the pilot reference and a last group of code sets least likely to be used to generate the pilot reference.

17. The method of claim 10, wherein the searching for the pilot reference is performed for each group and includes detecting for the pilot reference in a set of samples based on the codes in the group to provide one or more candidate peaks, and processing each candidate peak to determine acquisition of the pilot reference.

18. The method of claim 17, wherein the searching for the pilot reference further includes pipelining the detecting and processing for different groups to shorten pilot acquisition time.

19. The method of claim 10, wherein the searching for the pilot reference is performed for each group and includes:

detecting for the pilot reference in a set of samples based on the codes in the group to provide a plurality of detected peaks, dwelling on the plurality of detected peaks to provide one or more candidate peaks, and processing each candidate peak to determine acquisition of the pilot reference.

20. The method of claim 19, wherein the detecting and dwelling are performed on different sets of samples.

21. The method of claim 19, wherein the detecting and dwelling are performed using different sets of parameter values.

22. The method of claim 19, wherein each group is partitioned into a plurality of segments, and wherein the detecting is performed on each of the plurality of segments and one or more detected peaks are provided for each segment.

23. The method of claim 10, wherein the searching is performed using a plurality of stages, wherein each stage is associated with a respective set of parameter values used for the searching.

24. The method of claim 23, wherein the searching is performed for the plurality of groups for one stage at a time.

25. The method of claim 23, wherein the searching is performed for a first set of one or more groups for the plurality of stages followed by a second set of one or more groups for the plurality of stages.

26. The method of claim 23, wherein the searching is performed using two stages.

27. The method of claims 10, wherein the communication system is a CDMA system.

28. The method of claim 27, wherein the CDMA system conforms to IS-856 standard.

29. A method for acquiring a gated pilot reference in a wireless communication system, comprising:
    partitioning an overall code space in which the pilot reference may be found into a plurality of groups of non-overlapping code sets, wherein each code set is representative of a specific PN sequence with a particular offset;
    ordering the plurality of groups based on likelihood of detecting the pilot reference in each of the groups, with a first group being most likely to be used to generate the pilot reference and a last group being least likely to be used to generate the pilot reference;
    searching for the pilot reference based on the plurality of groups, one group at a time, starting with the first group and ending with the last group; and
    terminating the searching upon acquisition of the pilot reference,
    wherein the first group contains all possible specific pilot offsets for PN_INC=max.

30. The method of claim 29, wherein each of the specific pilot offsets in the first group is either 0 or a multiple of 4.

31. The method of claim 30, wherein each of the specific pilot offsets in a second group is a multiple of 2, but not of 4.

32. A receiver unit in a wireless communication system, comprising:
    a searcher element configurable to receive and correlate a first set of samples in accordance with a plurality of groups of PN sequences to provide correlated values used to detect a gated pilot reference, wherein We plurality of groups comprise an overall code space in which the pilot reference may be found, wherein a first group contains all possible specific pilot offsets for PN_INC=max, and are ordered based on likelihood of detecting the pilot reference in each of the groups, and wherein the plurality of groups are used to searched for the pilot reference based on their order and searching terminates upon acquisition of the pilot reference.

33. The receiver unit of claim 32, further comprising:
    a demodulation element configurable to receive and process a second set of samples based on a candidate peak, found via processing of the correlated values, to provide an indication of the acquisition of the pilot reference.

34. The receiver unit of claim 33, further comprising:
    a controller configured to direct operation of the searcher element and the demodulation element.

35. The receiver unit of claim 34, wherein the controller is further configured to provide to the searcher element a set of values for parameters used to correlate the first set of samples with the groups of PN sequences.

36. The receiver unit of claim 26, wherein each of the PN sequences in the first group has a specific pilot offset of either 0 or a multiple of 4.

37. The receiver unit of claim 36, wherein each of the PN sequences in a second group has a specific pilot offset of a multiple of 2, but not of 4.

38. An article of manufacture comprising:
    a computer usable medium having computer readable program code means embodied therein for causing a gated pilot reference to be acquired in a wireless communication system, the computer readable program code means in said article of manufacture comprising:
    computer readable program code means for partitioning an overall code space in which the pilot reference may be found into a plurality of groups of codes, a first group of codes comprising code sets corresponding to all possible specific pilot offsets for PN_INC=max:
    computer readable program code means for ordering the plurality of groups based on likelihood of detecting the pilot reference in each of the groups;
    computer readable program code means for searching for the pilot reference in accordance with the ordered groups; and
    computer readable program code means for terminating the searching upon acquisition of the pilot reference.

39. A program storage device readable by a machine, tangibly embodying a program of instructions executable by the machine to perform method steps for acquiring a gated pilot reference, said method steps comprising:
    partitioning an overall code space in which the pilot reference may be found into a plurality of groups of codes, a first groan of codes comprising code sets corresponding to all possible specific pilot offsets for PN_INC=max;
    ordering the plurality of groups based on likelihood of detecting the pilot reference in each of the groups;
    searching for the pilot reference in accordance with the ordered groups; and
    terminating the searching upon acquisition of the pilot reference.

40. A device comprising:
    a searcher element configurable to receive and correlate a first set of samples in accordance with a plurality of groups of PN sequences to provide correlated values used to detect a gated pilot reference, wherein the plurality of groups comprise an overall code space in which the pilot reference may be found, wherein a first group contains all possible specific pilot offsets for PN_INC=max, and are ordered based on likelihood of detecting the pilot reference in each of the groups, and wherein the plurality of groups are used to searched for the pilot reference based on their order and searching terminates upon acquisition of the pilot reference.

* * * * *

UNITED STATES PATENT AND TRADEMARK OFFICE
CERTIFICATE OF CORRECTION

PATENT NO.        : 6,813,478 B2                                       Page 1 of 1
APPLICATION NO. : 09/846963
DATED             : November 2, 2004
INVENTOR(S)       : Serguei A. Glazko et al.

It is certified that error appears in the above-identified patent and that said Letters Patent is hereby corrected as shown below:

On the Title page, at (75) please insert:  Rao Yallapragada, San Diego, CA (India)

Signed and Sealed this

Twenty-third Day of September, 2008

JON W. DUDAS
*Director of the United States Patent and Trademark Office*